United States Patent
Sarkar et al.

(10) Patent No.: US 11,600,091 B2
(45) Date of Patent: *Mar. 7, 2023

(54) PERFORMING ELECTRONIC DOCUMENT SEGMENTATION USING DEEP NEURAL NETWORKS

(71) Applicant: Adobe Inc., San Jose, CA (US)

(72) Inventors: Mausoom Sarkar, New Delhi (IN); Arneh Jain, Kerala (IN)

(73) Assignee: Adobe Inc., San Jose, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/327,382

(22) Filed: May 21, 2021

(65) Prior Publication Data
US 2021/0279461 A1 Sep. 9, 2021

Related U.S. Application Data

(63) Continuation of application No. 16/539,634, filed on Aug. 13, 2019, now Pat. No. 11,042,734.

(51) Int. Cl.
*G06K 9/62* (2022.01)
*G06V 30/414* (2022.01)
(Continued)

(52) U.S. Cl.
CPC ......... *G06V 30/414* (2022.01); *G06K 9/6256* (2013.01); *G06N 3/08* (2013.01);
(Continued)

(58) Field of Classification Search
CPC .. G06V 30/414; G06V 30/412; G06V 30/416; G06V 10/26; G06V 10/764;
(Continued)

(56) References Cited

U.S. PATENT DOCUMENTS 6,470,094 B1  10/2002  Lienhart et al.
6,473,522 B1  10/2002  Lienhart et al.
(Continued)

OTHER PUBLICATIONS

S. Ajward, N. Jayasundara, S. Madushika and R. Ragel, "Converting printed Sinhala documents to formatted editable text," 2010 Fifth International Conference on Information and Automation for Sustainability, 2010, pp. 138-143, doi: 10.1109/ICIAFS 2010. 5715649. (Year: 2010).

(Continued)

*Primary Examiner* — Ali Bayat
(74) *Attorney, Agent, or Firm* — Keller Preece PLLC (57) ABSTRACT

Techniques for document segmentation. In an example, a document processing application segments an electronic document image into strips. A first strip overlaps a second strip. The application generates a first mask indicating one or more elements and element types in the first strip by applying a predictive model network to image content in the first strip and a prior mask generated from image content of the first strip. The application generates a second mask indicating one or more elements and element types in the second strip by applying the predictive model network to image content in the second strip and the first mask. The application computes, from a combined mask derived from the first mask and the second mask, an output electronic document that identifies elements in the electronic document and the respective element types.

20 Claims, 8 Drawing Sheets

(51) Int. Cl.
 *G06T 7/12* (2017.01)
 *G06N 3/08* (2023.01)
 *G06V 30/412* (2022.01)
 *G06V 30/416* (2022.01)

(52) U.S. Cl.
 CPC .............. *G06T 7/12* (2017.01); *G06V 30/412* (2022.01); *G06V 30/416* (2022.01)

(58) Field of Classification Search
 CPC ...... G06V 10/82; G06K 9/6256; G06K 9/627; G06N 3/08; G06N 3/0481; G06N 3/0445; G06N 3/0454; G06T 7/12
 USPC .......................................................... 382/173
 See application file for complete search history.

(56) References Cited

U.S. PATENT DOCUMENTS

| | | | |
|---|---|---|---|
| 8,244,035 B2 | 8/2012 | Hamaguchi | |
| 10,395,772 B1* | 8/2019 | Lucas | G06V 30/416 |
| 10,671,892 B1 | 6/2020 | Daskalov et al. | |
| 10,915,788 B2* | 2/2021 | Hoehne | G06V 30/413 |
| 10,936,863 B2 | 3/2021 | Simantov et al. | |
| 2011/0007970 A1* | 1/2011 | Saund | G06V 30/155 |
| | | | 382/176 |
| 2016/0217119 A1 | 7/2016 | Dakin et al. | |
| 2017/0091544 A1* | 3/2017 | Adachi | G06F 21/6254 |
| 2018/0181866 A1 | 6/2018 | Dalle et al. | |
| 2020/0082218 A1* | 3/2020 | Hoehne | G06V 10/82 |
| 2020/0302208 A1* | 9/2020 | Hoehne | G06V 30/40 |

OTHER PUBLICATIONS

M. Orstavik, and T. Midtbo, "A New Era for Feature Extraction in Remotely Sensed Images by The Use of Machine Learning," Kart og Plan, 2017, vol. 77, pp. 93-107, (Year: 2017).

Maggiori, E., Tarabalka, Y., Charpiat, G., & Alliez, P. "High-resolution Semantic labeling with convolutional neural networks," arXiv, 2016, doi: 10.48550/arXiv.1611.01962 (Year: 2016).

Zhang, Y., Lee, K., & Lee, H. (Jun. 2016). Augmenting supervised neural networks with unsupervised objectives for large-scale image classification. In International conference on machine learning (pp. 612-621). PMLR. (Year: 2016).

Corbelli, A., Baraldi, L., Grana, C., & Cucchiara, R. (Dec. 2016). Historical document digitization through layout analysis and deep content classification. In 2016 23rd International Conference on Pattern Recognition (ICPR) (pp. 4077-4082). IEEE. (Year: 2016).

Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Chann. (Year: 2015).

Luo, S., Yang, Y., Yin, Y., Shen, C., Zhao, Y., & Song, M. "DeepSIC: Deep semantic image compression," arXiv, 2018, doi: 10.48550/arXiv.1801.09468 (Year: 2018).

Wick, C. and Puppe, F., "Fully Convolutional Neural Networks for Page Segmentation of Historical Document Images", arXiv, 2018, doi: 10.1109/DAS.2018.39 (Year: 2018).

Wang, H., Wang, Y., Zhang, O., Xiang, S., & Pan, O. (2017). Gated convolutional neural network for semantic segmentation in high-resolution images. Remote Sensing, 9(5), 446. (Year: 2017).

U.S. Appl. No. 15/927,686, Mar. 21, 2022, Office Action.
U.S. Appl. No. 16/539,634, Feb. 24, 2021, Notice of Allowance.
U.S. Appl. No. 15/927,686, Nov. 4, 2022, Notice of Allowance.

* cited by examiner

PERFORMING ELECTRONIC DOCUMENT SEGMENTATION USING DEEP NEURAL NETWORKS

CROSS REFERENCE TO RELATED APPLICATIONS

The present application is a continuation of U.S. application Ser. No. 16/539,634, filed on Aug. 13, 2019. The aforementioned application is hereby incorporated by reference in its entirety.

TECHNICAL FIELD

This disclosure relates generally to electronic document segmentation and more particularly to using deep learning to identify elements within an electronic document and a hierarchy that relates the identified elements.

BACKGROUND

With advancements in technology, electronic forms are often used for various transactions such as interacting with businesses and governments. But paper forms remain in use. For example, an initial registration may be performed with a paper form, which must then be scanned and segmented to generate a corresponding electronic version. This segmentation involves, for example, recognizing different objects in a scanned version of a paper document. These objects include text boxes, images, and the like. But a segmentation operation may fail to reliably distinguish form-specific elements such as form fields, widgets, and text runs and the structural hierarchies that relate these elements.

SUMMARY

Techniques for document segmentation are disclosed. For example, a document processing application accesses, by a processing device, an electronic document image that is a captured image of a document. The document processing application segments the electronic document image into strips, including a first strip and a second strip. The first strip overlaps the second strip. The document processing application generates a first mask indicating one or more elements and element types in the first strip by applying a predictive model network to image content in the first strip and a prior mask generated from image content of the first strip. The document processing application generates a second mask indicating one or more elements and element types in the second strip by applying the predictive model network to image content in the second strip and the first mask. The document processing application computes, from the first mask and the second mask, a combined mask that indicates elements and corresponding element types present in the electronic document. The document processing application creates, from the combined mask, an output electronic document that identifies elements in the electronic document and the respective element types.

These illustrative features are mentioned not to limit or define the disclosure, but to provide examples to aid understanding thereof. Additional aspects are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Embodiments of the present disclosure involve semantic segmentation of electronic documents. For example, embodiments of the present disclosure involve analyzing electronic documents to determine structural elements and fields such as text boxes, radio buttons, and widgets and a hierarchy that relates these elements and fields. These embodiments involve providing a document to a network of predictive models that collectively output a prediction of whether an element is present at a given location of the document, and if so, the type.

For instance, a network of predictive models is applied to an input document and thereby generates segmentation data. This segmentation data indicates, for each pixel or position in the input document, whether the pixel or position in the document corresponds to a structural element (as opposed to being a background), and, if so, which type of structural element corresponds to the pixel and location. The segmentation data also includes a hierarchy that relates the elements. For example, the hierarchy could indicate whether multiple text runs are present within a text box, whether a field includes a widget and a caption.

In some aspects, to generate this segmentation data, the input document is provided, in a piecemeal manner, to the network of predictive models, where each predictive model is trained to perform a different role, such as identifying a different type of object (e.g., text block, field, element, etc.). As an example, a first strip of the input document is provided to a given predictive model along with a previously predicted mask. The predicted mask is generated by applying the predictive model to a second strip that overlaps the first strip within the input document. For instance, a first strip might contain a text box and the start of a border, which continues into a second strip. Therefore, by providing the predicted mask of the first strip, which identifies the start of the border, into the predictive model to predict the elements of the second strip, the border is identified to the predictive model on the second iteration.

In this manner, previously predicted masks guide subsequent predictions, resulting in an increase in accuracy of the elements occurring in the document. Continuing the example, a predicted mask from the second strip is based on not only the document information in the second strip, pixels that represent a continuation of a border (but are not identified as such), but also on information present in the mask of the first strip, e.g., a label that identifies the start of the border).

Certain embodiments provide improvements relative to existing software tools for creating digital documents in which different types of document elements are recognizable by a computing system. For instance, existing software tools for segmenting documents may fail to reliably distinguish form-specific elements such as form fields, widgets, and text runs and the structural hierarchies that relate these elements. These problems could decrease the utility of document processing tools that are used to automatically edit electronic documents. For instance, due to memory constraints, existing tools are forced rely on low resolution versions of input documents, thereby causing more detailed document elements (e.g., smaller text fields, smaller text runs, etc.) to be overlooked and not classified as the appropriate element type. Existing tools may also result in imprecise determination of boundaries between different document elements. Such classifications errors, imprecise boundaries, or both could prevent a computing device from recognizing certain elements in the document and leveraging this recognition to automate one or more editing operations.

Embodiments described herein can involve improved document segmentation that increases the accuracy with which different document elements are classified, increases the precision with which boundaries between different elements are determined, or both. For instance, document segmentation is performed by applying particular rules applied by the computing device to a digitized input document. The particular rules, which are embodied in one or more neural networks described herein, include predictive models that are applied to overlapping strips of an input document in conjunction with a predicted mask of a previous strip and providing the overlapped segment into trained models. These particular rules (e.g., predictive models implemented via neural networks) used to automate a document segmentation process can improve the operation of software tools used to create digital documents having different elements that are recognizable by a computing system to facilitate edits to the document. In some embodiments, using the overlapping strips approach can provide improvements in computational efficiency, such as a reduction in memory consumption, that enable a higher-resolution document to be processed as compared to existing solutions. By using a higher-resolution document, greater detection precision can be obtained, resulting in improved distinctions between identified document features.

Figure 1:
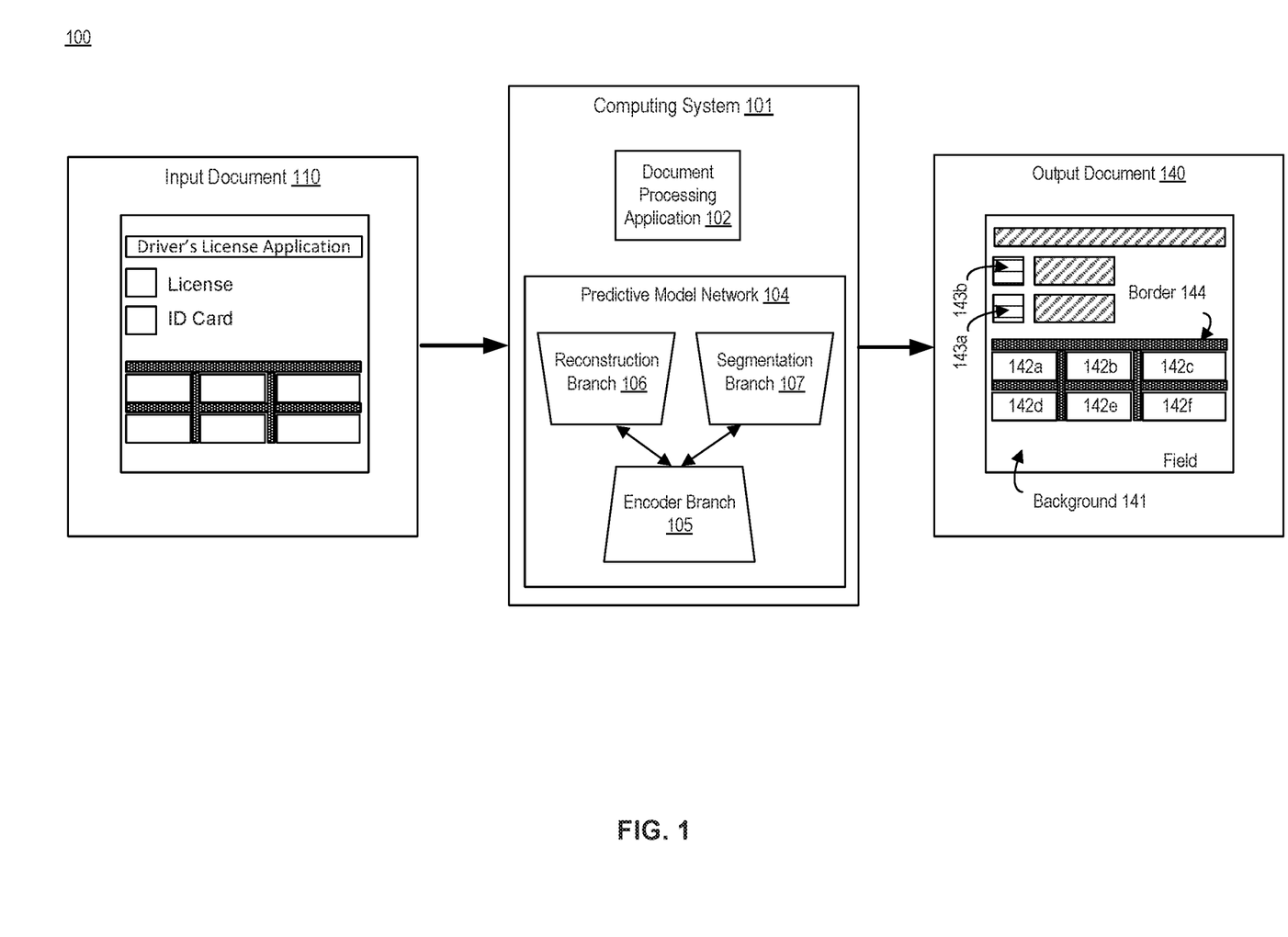
FIG. 1 depicts an example of a computing environment for document segmentation, according to an embodiment of the present disclosure.

Turning now to the figures, FIG. 1 depicts an example of a computing environment for document segmentation, according to an embodiment of the present disclosure. FIG. 1 depicts computing environment 100 in which a computing system 101 uses predictive model network 104 to perform a document segmentation that transforms an input document 110 into an output document 140. The computing system 101 analyzes input document 110 using predictive model network 104 an encoder branch 105, a reconstruction branch 106, and/or a segmentation branch 107. The predictive model network 104 generates segmentation data that indicates locations of various elements within input document 110. The computing system 101 generates output document 140 that includes elements of the input document 110 and the segmentation data.

Examples of an input document 110 include an electronic image, a Portable Document Format (PDF)® document, and the like. The input document 110 lacks metadata that explicitly identifies these elements or their element type. In some cases, the input document 110 is generated by digitizing a paper document using the document processing application 102. Input document 110 includes graphical data (e.g., glyphs depicting text, shapes depicting fields, etc.) that visually depicts various elements such as text runs, widgets, images, and fields, tables, lists, sections, titles, and choice groups. Choice groups (or choice fields) refer to checkboxes that permit selection (e.g., "yes" or "no"). A field refers to a particular element in which text (e.g., a name, address, etc.) is to be input. In the example of FIG. 1, the input document 110 includes borders delineating several text fields, e.g., "Driver's License Application," "License," and "ID card." The text fields "License" and "ID card" are adjacent choice fields.

Document processing application 102 uses the predictive model network 104 to classify various graphical elements in the input document as elements of the document. In particular, different particular models can be trained to detect specific features (text box, fields, choice groups, etc.) from one or more features of the graphical content within the input document. Additionally, document processing application 102 can perform document or image processing functions such as editing, rotating, cropping, and the like.

More specifically, predictive model network 104 includes one or more predictive models such as recurrent neural networks (RNNs), convolutional encoders, and/or convolutional decoders, generally organized into an encoder branch 105, a reconstruction branch 106, and/or a segmentation branch 107. Encoder branch 105, which can include one or more convolutional encoders and/or recurrent neural networks, generates various feature maps, each of which indicates a specific presence of a feature. The outputs of encoder branch 105 are passed to segmentation branch 107, which can include one or more decoders. Each decoder is trained to predict whether a specific type of element, for example, a text box or a field, is present in the document. Reconstruction branch 106 can include one or more decoders and is used to reconstruct a layout of the document.

Output document MO includes the same or similar visual features as the input document HO along with segmentation data indicating a classification of elements. In this example, document processing application 102 has identified a background 141 and fields 142a-f, choice fields 143a-b, and border 144. Each predictive model, e.g., a decoder of the segmentation branch 107, is trained to identify a specific feature. For example, a first predictive model is trained to detect text boxes and outputs a mask indicating any pixels that correspond to a text box, and a second predictive model can be trained to detect a border. In another example, a predictive model could also identify multiple non overlapping elements within an image, for example detect text runs and widgets. By using the reconstruction branch 106, document processing application 102 can combine the various masks together to form output document MO. An example of a process for identifying such features is depicted in FIG. 2.

Figure 2:
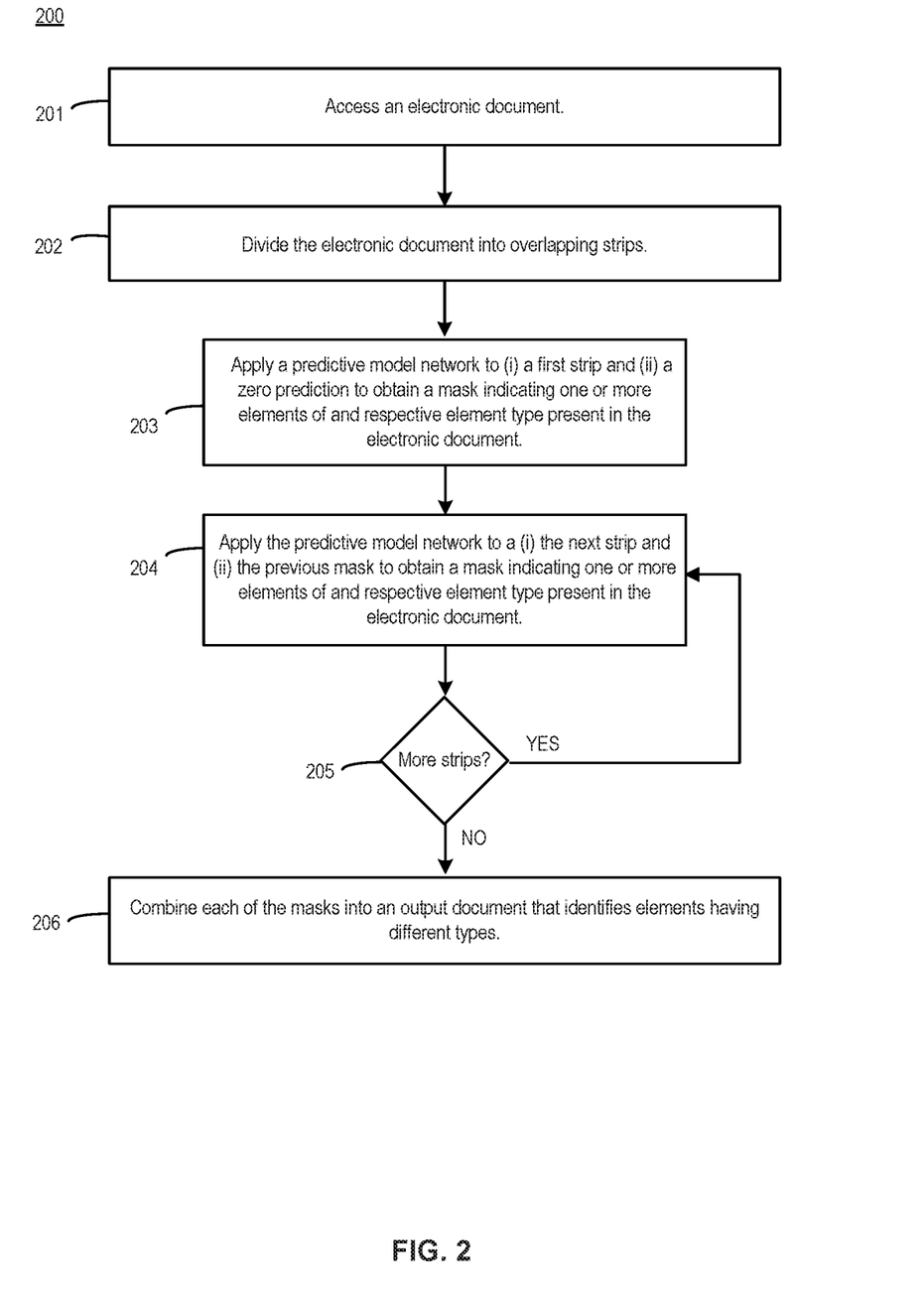
FIG. 2 depicts an example of a process for performing document segmentation, according to an embodiment of the present disclosure.

FIG. 2 depicts an example of a process 200 for performing document segmentation, according to an embodiment of the present disclosure. Process 200 can be performed by document processing application 102 in conjunction with one or more of recurrent neural networks 104a-n, convolutional encoders 105a-n, and convolutional decoders 106a-n.

Figure 3:
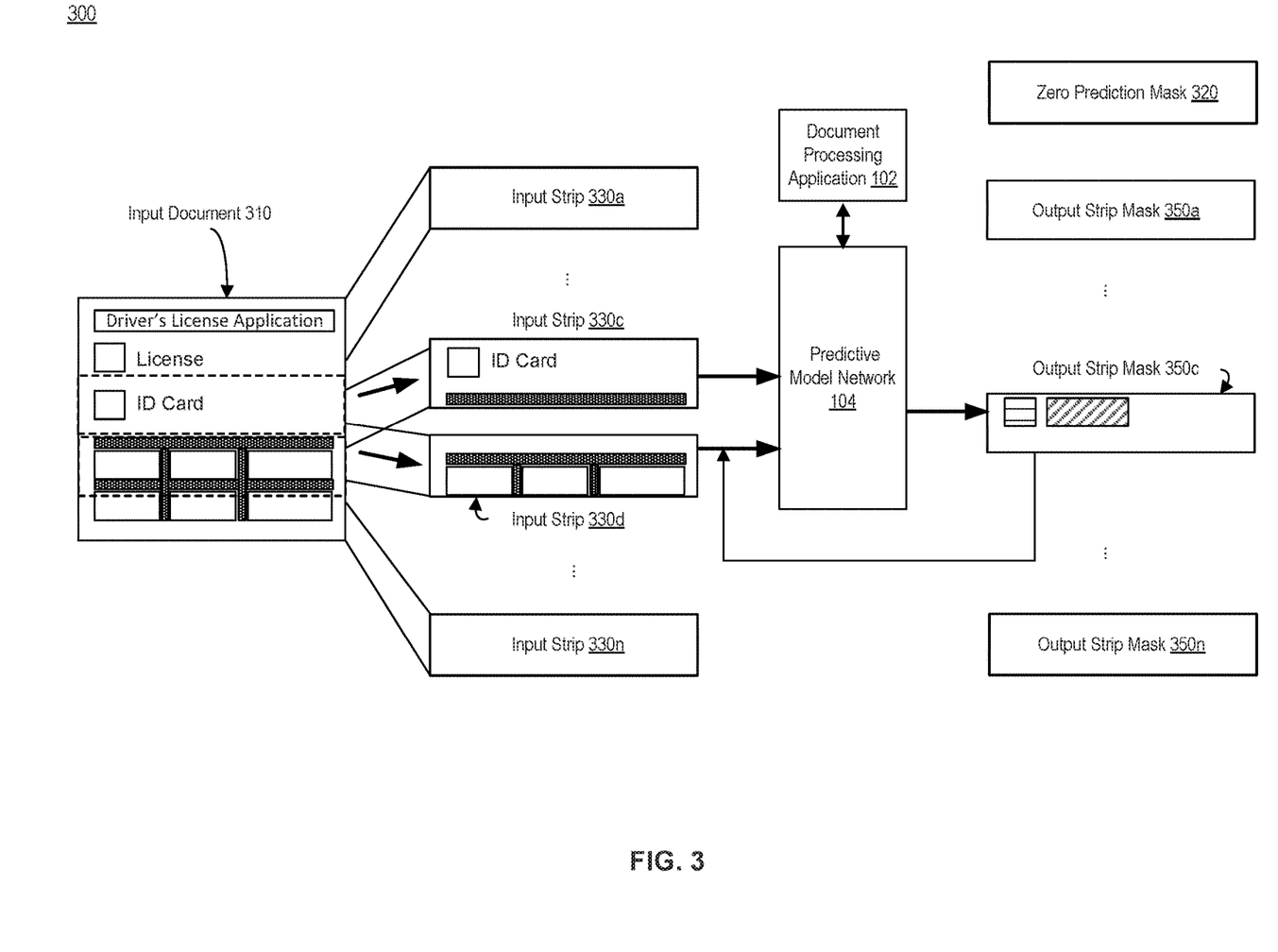
FIG. 3 depicts examples of overlapping strips of an input document in conjunction with a mask of a previous strip, according to an embodiment of the present disclosure.

For illustrative purposes, blocks 201-205 are discussed with respect to FIG. 3. As depicted in the example of FIG. 3, this electronic document includes overlapping strips of an input document in conjunction with a mask of a previous strip, according to an embodiment of the present disclosure. FIG. 3 depicts strip overlapping environment 300, which includes document processing application 102, input document 310, zero prediction mask 320, input strips 330a-n, and output strip masks 350a-n. As depicted, input document 310 includes elements such as text boxes and borders, which are not identified within input document 310.

At block 201, process 200 involves accessing an electronic document. For instance, in the example of FIG. 3, the document processing application 102 accesses an input document 310. Input document 310 can include an electronic document image that represents the document. In some cases, the input document 310 can be resized to a particular set of dimensions. An example set of dimensions is 1800×1000 pixels. The aspect ratio of the original input document can be maintained.

At block 202, process 200 involves dividing the electronic document into overlapping strips. A strip is, for example, a portion of the document that spans the width of the document, where each strip has a height that causes various strips in the document to overlap. In the example of FIG. 3, the document processing application 102 divides input document 310 into input strips 330a-n. Input strip 330c overlaps with input strip 330d.

The strips can extend across the electronic document in one dimension (e.g., horizontally) and overlap in a second dimension (e.g., vertically). Different approaches can be used for determining the overlapping strips. For example, document processing application 102 can create the first strip by extracting, from the document, a first portion that extends from an edge of the document in a first dimension to an end point. The distance between the edge and the end point equals the width. The first portion can include an intermediate point that is between the edge and the end point. Document processing application 102 creates the second strip by extracting a second portion of the electronic document image. The second portion extends from the intermediate point and continues past the end point of the first portion by the width, thereby overlapping the first and second strips. This process can continue.

As can be seen, some white space and part of a border is present in both input strip 330c and input strip 330d. The document processing application 102 applies the predictive model network 104 to the strips. Each model within segmentation branch 107 generates a prediction of the presence of an element and, if an element is present, an element type.

For instance, at block 203, process 200 involves applying a network of predictive models to a first strip and a zero prediction mask. The zero prediction mask, or a zero prior, indicates the prediction of an image that of zero pixels, representing that no element is present. Examples of dimensions of the zero prediction mask are 600×1000×n, where n is a number of classes that are can be predicted using the network. The zero prediction mask is used due to the absence of a predicted mask for a strip before a first strip in the input document.

In the example of FIG. 3, document processing application 102 applies a set of predictive models to an input strip 330a of the input document and zero prediction mask 320. The zero prediction mask 320 represents a prediction of the elements within a strip that is a blank document (e.g., a tensor with dimensions 600×1000×5). In turn, the predictive models generate output strip mask 350a, which includes an identification of elements in input strip 330a.

An example of a mask is a grid of pixel values, each value representing whether the corresponding pixel is an element of a specific type or not. A mask indicates which elements and element types are in an electronic document by having one or more selected pixels at locations where the specific element type is identified. A strip mask refers to a mask generated from a strip of an input document.

At block 204, process 200 involves applying a network of predictive models to a strip and the previously predicted mask to obtain a mask indicating one or more elements of the respective element type present in the electronic document. Block 204, unlike block 203, involves applying the predictive models to both a document strip and a non-zero prediction from another strip previously analyzed by the predictive models. In the example of FIG. 3, the document processing application 102 applies the predictive model network 104 to input strip 330b and output strip mask 350a. Predictive model network 104 can predict, for each input strip 330a-n, a corresponding output strip mask 350a-n. An example of a predictive model network is discussed further with respect to FIG. 4.

At block 205, process 200 involves determining whether the electronic document includes any more strips. Document processing application 102 checks whether any additional strips are present in the image. If there are more strips, then document processing application 102 returns to block 205 to continue with input strip 330c and output strip mask 350b, and so on. If no more strips exist, e.g., upon completing the prediction of output strip mask 350n then document processing application 102 moves to block 206.

At block 206, process 200 involves combining each of the masks into an output document that identifies elements having different types. For instance, in FIG. 3, the document processing application 102 combines output strip masks 350a-n into a combined output mask that identifies features throughout the input document. Combining the output strip masks 350a can involves overlaying the masks. In the case that predictions of elements in two masks are in conflict, the most later-generated mask is used. The combined output mask represents the predicted features of the entire electronic document (as opposed to a strip).

The strip-based approach depicted in FIGS. 2 and 3 can improve a document segmentation process. For example, using strips can reduce the amount of memory required by document processing application 102. Reducing the memory needed can facilitate higher resolution input documents as compared to previous solutions, because some machine learning models can use a lot of memory. This approach therefore enables more advanced machine learning models to be used, as the approach is more efficient with memory consumption as compared to previous solutions.

Further, the approach of segmenting into overlapping strips increases an amount of context available to the predictive models. This approach can improve prediction accuracy, for example, by ensuring that a mask of a strip includes at least some of the context of objects that have been predicted in a previous strip. For example, by receiving an overlapping strip and associated mask, an area identified as white space is not erroneously identified as white space in a text box or field.

Process 200 can be performed downward on a document, e.g., from the top to the bottom, upward, e.g., from the bottom to the top, or sequentially in each direction. For example, a third mask can be generated generating by applying the predictive model network to image content in the second strip and a prior mask. Subsequently, a fourth mask can be generated by applying the predictive model network to image content in the first strip and the third mask. A prediction is therefore made based on the first strip by using the previous mask from the second strip. In this manner, predictions are bi-directional. For example, strops higher in the page can benefit from predictions lower in the page as well as strips lower in the page benefitting from previous predictions of strips higher in the page.

Figure 4:
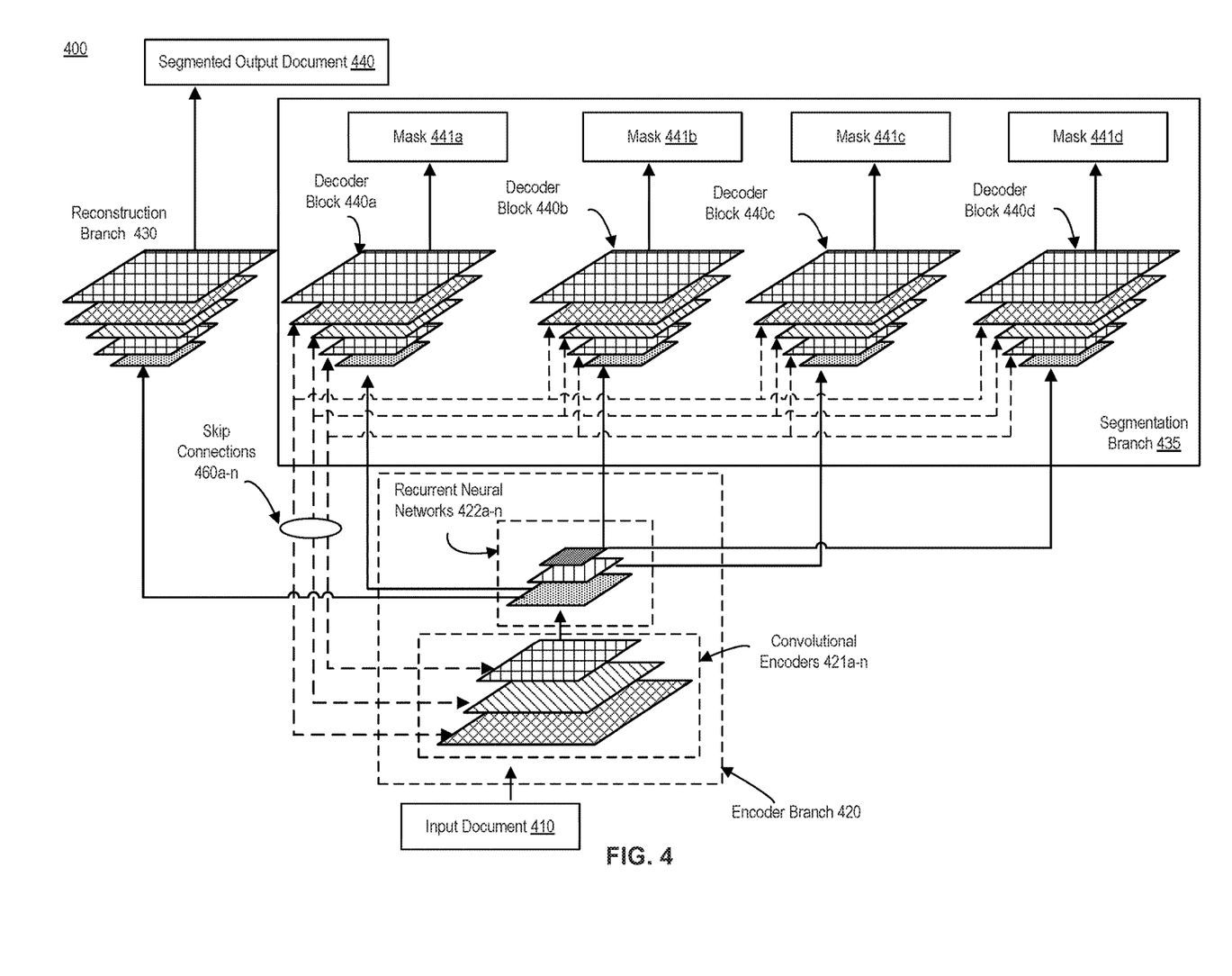
FIG. 4 depicts an example of a network structure for document segmentation, according to an embodiment of the present disclosure.

FIG. 4 depicts an example of a network structure for document segmentation, according to an embodiment of the present disclosure. In this example, a predictive model network 400, which is an example of predictive model network 104 depicted in FIGS. 1 and 3, is applied to an input document 410. The predictive model network 400 includes an encoder branch 420, reconstruction branch 430, and segmentation branch 435 (which includes decoder blocks 440a-d, masks 441a-d), segmented output document 440, and skip connections 460a-n.

Predictive model network 400 can receive entire input documents at a time or use the overlapping strip approach discussed with respect to FIG. 2.

In an example, the encoder branch 420 receives input document 410. Encoder branch 420 includes convolutional encoders 421a-n and recurrent neural networks 422a-n, which are used to determine one or more feature maps from input document 410. The feature maps generated by encoder branch 420 are provided to the decoder blocks 440a-d, each of which can classify a feature map as a different type. Encoder branch 420 acts as a common feature trunk connecting to the multiple decoder blocks 440a-d. In turn, each decoder blocks 440a-d outputs a corresponding mask 441a-d. Each mask indicates for each pixel, whether the pixel indicates a presence of a type of feature. The feature maps generated by encoder branch 420 are provided to the segmentation branch 435, which includes decoder blocks 440a-d, each of which can identify a different type of feature. Reconstruction branch 430 includes a decoder that is used to reconstruct a layout of the document.

The structure of predictive model network 400 restricts the encoder branch 420 from learning to perform multiple tasks. Instead, the encoder branch 420 learns to be more generic in function, leaving each of the decoder blocks 440a-d to perform the individualized tasks of identifying specific types of features within the document.

Convolutional encoders output a feature map or a feature vector that refers to a network of numeric values representing semantic characteristics and attributes. Convolutional encoders 421a-n receive as input the document and assign an importance to various objects within the document. Different layers of convolutional encoders 421a-n can be trained to predict different levels of features. For example, some layers can be trained to learn low-level features such as edges of text boxes while other layers can learn high-level features such as text boxes.

The output of convolutional encoders 421a-n is connected to the input to recurrent neural networks 422a-n. In some embodiments, the encoder branch 420 has one recurrent neural network for each decoder block 440a-d. In other cases, two or more decoder blocks can share the output of one or more of the recurrent neural networks 422a-n. For example, as depicted, decoder blocks 440b and 440d share an output of a recurrent neural network.

Examples of suitable parameters for the encoder branch 420 are as follows:

TABLE 1

Example parameters for encoder branch 420

| Layer Type | Count of Layers | Kernel Size (Kw × Kh) × Channels × Stride |
|---|---|---|
| Conv + BN + ReLu | 2 | 3 × 3 × 48 × 1 |
| Fork for skipConnection1 | | |
| Conv + BN + ReLu | 1 | 3 × 3 × 64 × 2 |
| Conv + BN + ReLu | 2 | 3 × 3 × 64 × 1 |
| Fork for skipConnection2 | | |
| maxPool | 1 | 3 × 3 × 64 × 2 |
| Conv + BN + ReLu | 2 | 3 × 3 × 96 × 1 |
| Fork for skipConnection3 | | |
| maxPool | 1 | 3 × 3 × 96 × 2 |
| Conv + BN + ReLu | 1 | 3 × 3 × 128 × 1 |
| Conv + BN + ReLu | 1 | 3 × 3 × 144 × 1 |
| Conv + BN + ReLu | 1 | 3 × 3 × 160 × 1 |
| Fork for skipConnection4 | | |
| maxPool | 1 | 3 × 3 × 144 × 2 |
| Conv + BN + ReLu | 2 | 3 × 3 × 196 × 1 |

The outputs of the encoder branch 420 are provided to the recurrent neural networks 422a-n. The recurrent neural networks 422a-n perform several functions, in part based on the internal state that is maintained. The recurrent neural networks can count a number of objects, learn a hierarchy, and correlate large and small features. For example, the recurrent neural networks can predict a field in which a caption ends with a colon and is followed by a white space and extrapolate a field to the entire blank region following the colon. In another example, the recurrent neural networks can detect nested lists without merging the lists into one big list. More specifically, the recurrent neural networks 422a-n receive feature maps from the convolutional encoders (e.g., dimensions height, width and number of classes). The recurrent neural networks can be bidirectional (for example, see FIG. 6). The outputs of the recurrent neural networks 422a-n are provided to the segmentation branch 435.

The outputs of the encoder branch 420 can be provided to the segmentation branch 435 via skip connections 460a-n. Segmentation branch 435 includes decoder blocks 440a-d and masks 441a-d. Each of the decoder blocks 440a-d determines one or more semantic characteristics of each pixel of the electronic document. Each decoder block is connected to the encoder branch 420, forming a fork such that different element types can be separately predicted. Each decoder block also classifies each pixel (i.e., determines to which element type each pixel belongs) based on the determined semantic characteristics.

Each decoder block is trained to detect a specific element type within the input document 410. For example, decoder block 440a can be trained to predict elements, 440b to predict text blocks, 440c to predict fields, and 440d to predict choice groups. Decoder blocks 440a-d each include one or more convolutional decoders. Each convolutional decoder can correspond to one of the convolutional encoders 421a-n.

Each convolutional decoder can be connected via a skip connection 460a-n. The skip connections 460a-n enable network structure to directly provide a low-level output from a layer of a convolutional encoder to a corresponding layer of one or more of the decoders. By using skip connections, the output of an encoder layer can bypass subsequent encoder layers and/or several decoder layers to be input directly into a desired decoder layer so as to capture low level features.

When two recurrent neural networks are present, each recurrent neural network runs on the rows of the feature map in an opposite directions from the other recurrent neural network. The output of the recurrent neural networks is a map of share (H×W×(2*S)), where S is the state size of each recurrent neural network. Examples of suitable parameters for the recurrent neural networks 422a-n follow. The decoder branches are created on the different forks mentioned in table 2 below, e.g., "fork for branch 1," "fork for branch 2," and "fork for branch 3."

TABLE 2

Example parameters for recurrent neural networks 422a-n.

| Layer Type | Count of Layers | Kernel Size (Kw × Kh) × Channels × Stride |
|---|---|---|
| BidirectionalVerticalRnn | 1 | 392 |
| BidirectionalHorzRnn | 1 | 392 |
| BidirectionalVerticalRnn | 1 | 288 |
| BidirectionalHorzRnn | 1 | 288 |
| Fork for Branch1 | | |
| BidirectionalVerticalRnn | 1 | 288 |
| BidirectionalHorzRnn | 1 | 288 |
| Fork for Branch2 | | |
| BidirectionalVerticalRnn | 1 | 288 |
| BidirectionalHorzRnn | 1 | 288 |
| Fork for Branch3 | | |

Example parameters for the decoder blocks 440a-n are shown below in table 3.

TABLE 3

Example parameters for decoder blocks 440a-n.

| Layer Type | Count of Layers | Kernel Size (Kw × Kh) × Channels × Stride |
|---|---|---|
| ConvTranspose | 1 | 5 × 5 × 144 × 2 |
| Conv + BN + ReLu | 1 | 1 × 1 × 144 × 1 |
| Concat SkipConnection4 | | |
| ConvTranspose | 1 | 3 × 3 × 128 × 2 |
| Conv + BN + ReLu | 1 | 1 × 1 × 96 × 1 |
| Concat SkipConnection3 | | |
| ConvTranspose | 1 | 3 × 3 × 64 × 2 |
| Conv + BN + ReLu | 1 | 1 × 1 × 32 × 1 |
| Concat SkipConnection2 | | |
| ConvTranspose | 1 | 3 × 3 × 16 × 2 |
| Conv + BN + ReLu | 1 | 3 × 3 × 8 × 1 |
| Concat SkipConnection1 | 1 | 1 |
| Conv + BN + ReLu | | 3 × 3 × 8 × 1 |
| Conv | 1 | 3 × 3 × Num classes |
| Sofmax | 1 | |

Reconstruction branch 430 includes a decoder network. This decoder network is trained to process a feature map obtained from the recurrent neural networks 422a-n to produce a reconstructed layout. In an example, the reconstruction branch 430 is configured with the parameters illustrated below in Table 4:

TABLE 4

Example parameters for the decoder within reconstruction branch 430

| Layer Type | Count of Layers | Kernel Size (Kw × Kh) × Channels × Stride |
|---|---|---|
| ConvTranspose | 1 | 5 × 5 × 144 × 2 |
| Conv + BN + ReLu | 1 | 1 × 1 × 128 × 1 |
| ConvTranspose | 1 | 3 × 3 × 96 × 2 |
| Conv + BN + ReLu | 1 | 1 × 1 × 64 × 1 |
| ConvTranspose | 1 | 3 × 3 × 32 × 2 |
| Conv + BN + ReLu | 1 | 1 × 1 × 16 × 1 |
| ConvTranspose | 1 | 3 × 3 × 8 × 2 |
| Conv + BN + ReLu | 1 | 1 × 1 × 1 × 1 |

Figure 5:
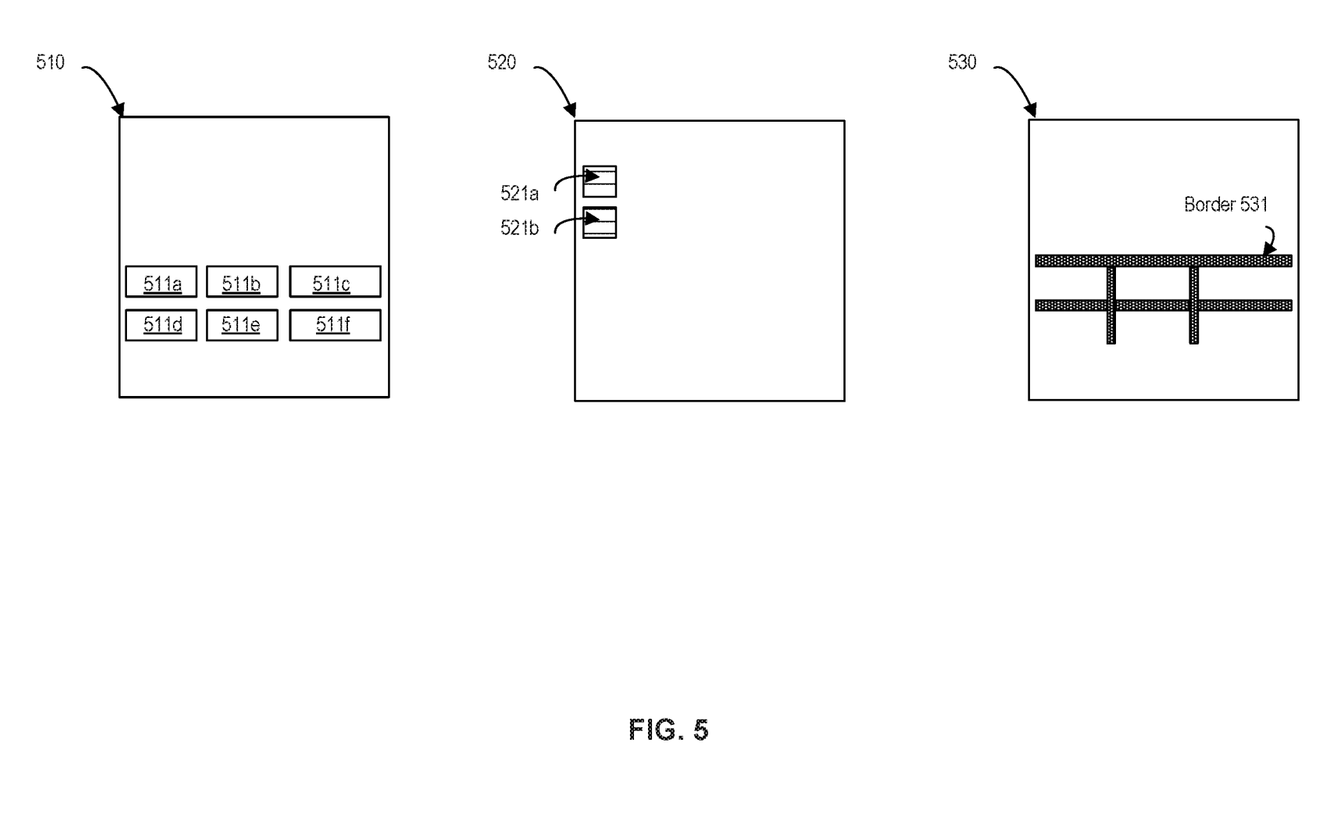
FIG. 5 depicts examples of masks, according to an embodiment of the present disclosure.

FIG. 5 depicts examples of masks 510, 520, and 530 that can be generated by the operations described above with respect to FIGS. 2-4. Mask 510 represents identified fields 511a-f that have been identified via the process 200. Mask 520 represents additional identified choice fields 521a-b that have been identified with the process 200. Mask 530 represents a border 531 that has been identified with the process 200.

Figure 6:
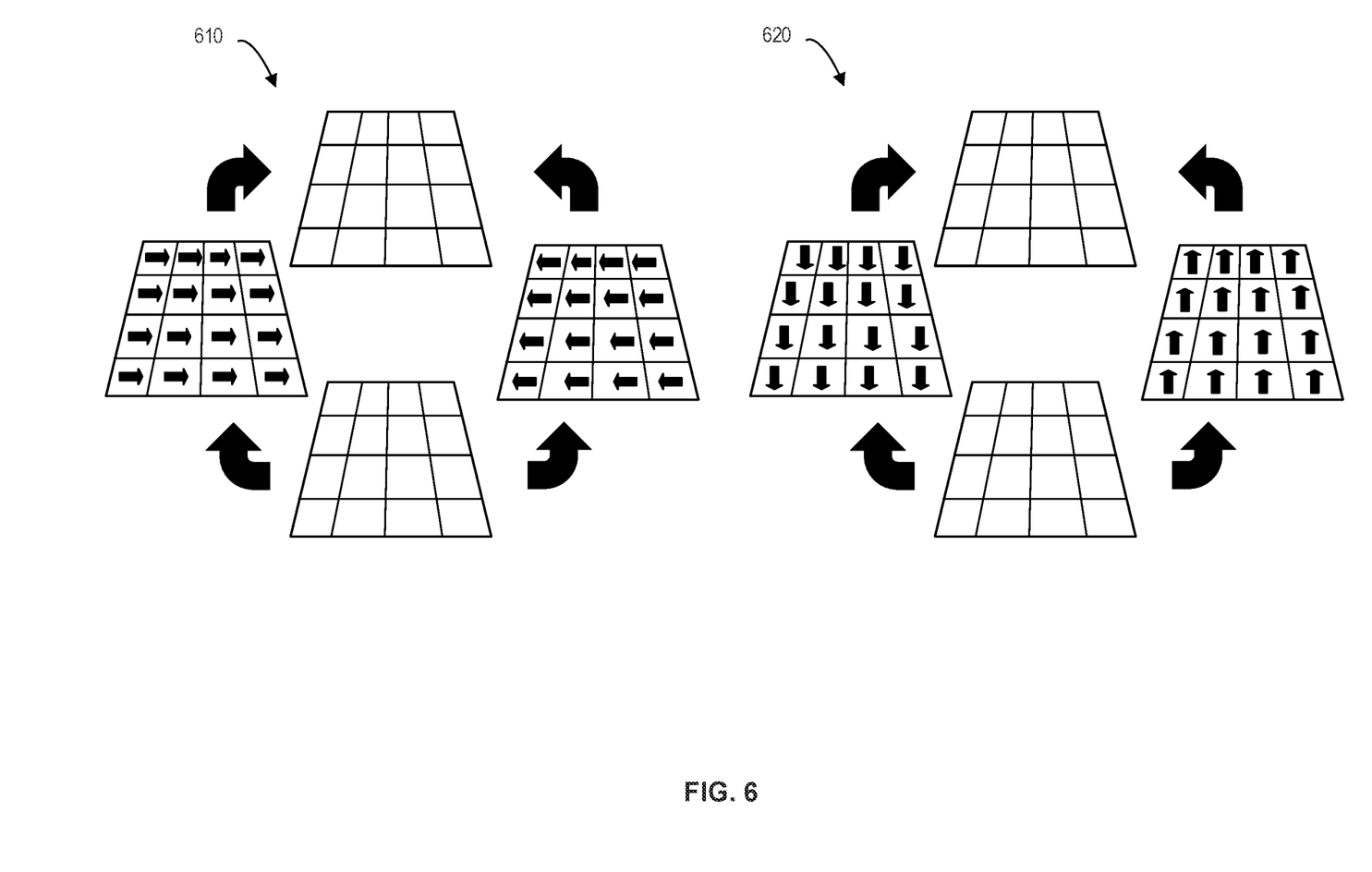
FIG. 6 depicts examples of layers of a recurrent neural network, according to an embodiment of the present disclosure.

FIG. 6 is a diagram depicting layers of a recurrent neural network, according to an embodiment of the present disclosure. FIG. 6 includes RNN 610 and RNN 620. RNNs 610 and 620 can represent one or more recurrent neural networks 422a-n. RNN 610 is an RNN with bidirectional horizontal RNN layers and RNN 620 is an RNN with bidirectional vertical RNN layers. Referring to RNN 610, the bidirectional horizontal RNN layers work on the map having dimension height×width×number of predictable classes as generated by the previous neural network layer. In particular, the bidirectional horizontal RNN layers in RNN 610 have two RNNs that run on all the rows of the feature map in reverse directions. The result is concatenated channel wise to generate a map of share H×W×(2*S) where S is the state size of each RNN.

In RNN 610, the bidirectional vertical RNN layers operate on a map having dimension H×W×C as generated by the previous neural network layer. In particular, the bidirectional vertical RNN layers of RNN 620 have two RNNs that run on all the columns in reverse directions. The result is concatenated channel wise to generate a map of share H×W×(2*S) where S is the state size of each RNN.

Figure 7:
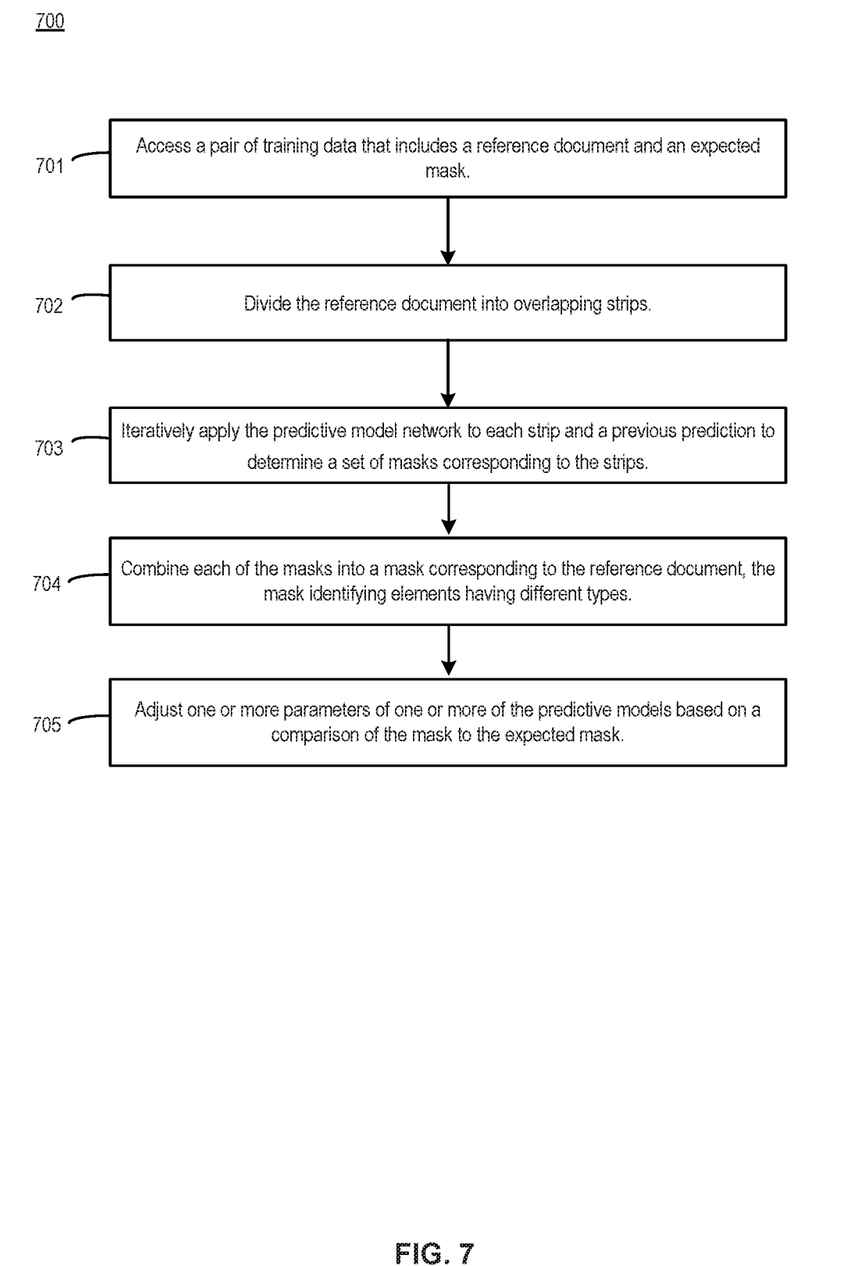
FIG. 7 depicts an example of a process for training predictive models to perform document segmentation, according to an embodiment of the present disclosure.

FIG. 7 depicts an example of a process 700 for training predictive models to perform document segmentation, according to an embodiment of the present disclosure. Process 700 can be performed by document processing application 102. Training enables the network of predictive models to determine low-level and high-level semantic characteristics of electronic documents. Training can be performed on the network as a whole, e.g., on predictive model network 400, by modifying parameters of the individual components, e.g., encoder branch 420, reconstruction branch 430, and/or segmentation branch 435 based on a measured loss.

At block 701, process 700 involves accessing a pair of training data that includes a reference document and an expected mask. Each training data includes a document used for training (e.g., a document including features such as text, images, and fields) and an expected mask. The expected mask identifies an expected output of the network of predictive models.

At block 702, process 700 involves dividing the reference document into overlapping strips. At block 702, process 700 involves operations substantially similar to those performed at block 202 of process 200.

At block 703, process 700 involves iteratively applying the predictive model network to each strip and a previous mask to determine a set of masks corresponding to the strips. At block 703, process 700 involves operations substantially similar to those performed at blocks 203-205 of process 200.

At block 704, process 700 involves combining each of the masks into a mask corresponding to the reference document, the mask identifying elements having different types. At block 704, process 700 involves operations substantially similar to those performed at block 206 of process 200.

At block 705, process 700 involves adjusting one or more parameters of one or more of the predictive models based on a comparison of the mask to the expected mask. Different predictive models may be trained based on different functions or criteria. For example, reconstruction branch 430 can be trained using a Euclidean loss as compared to the input document. The semantic segmentation branches, e.g., decoder blocks 440a-d can be trained using cross entropy against a set of ground truth labels.

Exemplary Computing Systems

Figure 8:
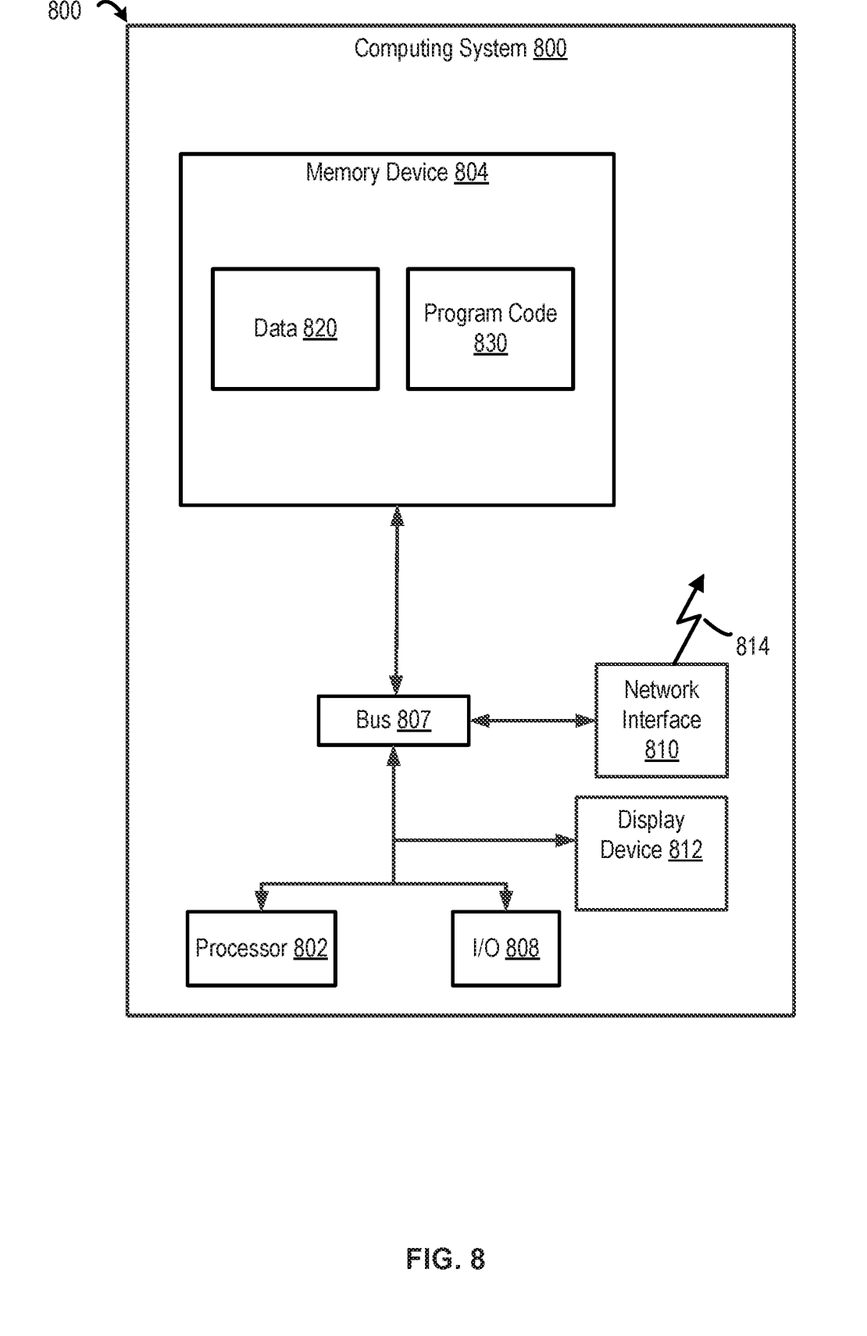
FIG. 8 depicts an example of a computing system for performing document segmentation, according to an embodiment of the present disclosure.

FIG. 8 is a diagram depicting an exemplary computing system for implementing a document processing application, according to an embodiment of the present disclosure. FIG. 8 depicts computing device 800, which is an example of computing system 101 and can execute document processing application 102. Any suitable computing system may be used for performing the operations described herein. The depicted example of a computing device 800, includes a processor 802 communicatively coupled to one or more memory devices 804. The processor 802 executes computer-executable program code 830 stored in a memory device 804, accesses data 820 stored in the memory device 804, or both. Program code 830 can be from document processing application 102 and/or predictive model network 104. Data 820 can be from document processing application 102 and/or predictive model network 104.

Examples of the processor 802 include a microprocessor, an application-specific integrated circuit ("ASIC"), a field-programmable gate array ("FPGA"), or any other suitable processing device. The processor 802 can include any number of processing devices or cores, including a single processing device. The functionality of the computing device may be implemented in hardware, software, firmware, or a combination thereof.

The memory device 804 includes any suitable non-transitory, computer-readable medium for storing data, program code, or both. Memory device 804 can include data, program code, or both, for document processing application 102. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 800 may also include a number of external or internal devices, such as input or output devices. For example, the computing device 800 is shown with one or more input/output ("I/O") interfaces 808. An I/O interface 808 can receive input from input devices or provide output to output devices. One or more busses 807 are also included in the computing device 800. The bus 807 communicatively couples one or more components of a respective one of the computing device 800.

The computing device 800 executes program code 830 that configures the processor 802 to perform one or more of the operations described herein. For example, the program code 830 causes the processor to perform the operations described in FIG. 2 or 3. The computing device 800 also includes a network interface device 810. The network interface device 810 includes any device or group of devices suitable for establishing a wired or wireless data connection to one or more data networks. The network interface device 810 may be a wireless device and have an antenna 814. The computing device 800 can communicate with one or more other computing devices implementing the computing device or other functionality via a data network using the network interface device 810. The computing device 800 can also include a display device 812. Display device 812 can be a LCD, LED, touch-screen or other device operable to display information about the computing device 800. For example, information could include an operational status of the computing device, network status, etc.

General Considerations

While the present subject matter has been described in detail with respect to specific aspects thereof, it will be appreciated that those skilled in the art, upon attaining an understanding of the foregoing may readily produce alterations to, variations of, and equivalents to such aspects. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter.

Any suitable programming, scripting, or other type of language or combinations of languages may be used to implement the teachings contained herein in software to be used in programming or configuring a computing device. Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting. The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
    accessing, by a processing device, a document image that is a captured image of a document;
    segmenting the document image into a plurality of overlapping strips;
    generating a plurality of masks indicating one or more elements and element types in the plurality of overlapping strips by applying a predictive neural network to:
        a given strip of the plurality of overlapping strips, and a portion of a previously-generated mask of an adjacent strip of the plurality of overlapping strips, the portion of the previously-generated mask of the adjacent strip corresponding to a portion of the given strip that overlaps with the adjacent strip;
    generating, from the plurality of masks, a combined mask that indicates elements and corresponding element types present in the document; and
    creating, from the combined mask, a segmented electronic version of the document that identifies the elements and corresponding element types.

2. The method of claim 1, further comprising generating a mask for a first strip by applying the predictive neural network to the first strip and a previously generated blank mask.

3. The method of claim 2, wherein segmenting the document image into a plurality of overlapping strips comprises:
    creating the first strip by extracting a first portion of the document image, wherein the first portion extends from an edge of the document image by a width and comprises an intermediate point; and
    creating a second strip by extracting a second portion of the document image, wherein the second portion extends from the intermediate point by the width.

4. The method of claim 1, wherein the predictive neural network comprises an encoder, a reconstruction decoder, a recurrent neural network, and a plurality of segmentation decoders.

5. The method of claim 4, further comprising, for the given strip and corresponding portion of the previously-generated mask of the adjacent strip:
    generating, utilizing the encoder and the recurrent neural network, one or more feature maps; and
    generating, utilizing the plurality of segmentation decoders, one or more masks indicating the elements and the corresponding element types present in the given strip.

6. The method of claim 5, wherein generating, utilizing the plurality of segmentation decoders, the one or more masks indicating the elements and the corresponding element types present in the given strip comprises generating a respective mask for each element type utilizing the plurality of segmentation decoders.

7. The method of claim 6, further comprising combining the respective mask for each element type for each strip to generate a plurality of combined masks, each combined mask indicating a respective element type present in the document.

8. The method as recited in claim 7, further comprising generating, utilizing the reconstruction decoder, an electronic version of the document.

9. The method as recited in claim 8, wherein creating, from the combined mask, the segmented electronic version of the document comprising combining the electronic version of the document and the plurality of combined masks.

10. The method of claim 1, wherein an element type is one of a border, a field, a choice field, a background, a text box, a widget, or an image.

11. A non-transitory computer-readable medium having program code stored thereon that, when executed by a processing device, causes the processing device to perform operations comprising:
    accessing a document image that is a captured image of a document;
    segmenting the document image into a plurality of overlapping strips;

generating, utilizing a predictive neural network, a plurality of strip masks indicating one or more elements and element types in the plurality of overlapping strips;

generating, from the plurality of strip masks, a plurality of combined masks that each indicate elements of a given element type present in the document;

generating, utilizing the predictive neural network, an electronic version of the document; and creating, from the plurality of combined masks and the electronic version of the document, a segmented electronic version of the document that identifies the elements and corresponding element types.

12. The non-transitory computer-readable medium of claim 11, wherein generating the plurality of strip masks indicating one or more elements and element types in the plurality of overlapping strips comprises applying the predictive neural network to:

a given strip of the plurality of overlapping strips, and a portion of a previously-generated mask of an adjacent strip of the plurality of overlapping strips, the portion of the previously-generated mask of the adjacent strip corresponding to a portion of the adjacent strip that overlaps with the given strip.

13. The non-transitory computer-readable medium of claim 12, wherein the predictive neural network comprises an encoder, a reconstruction decoder, a recurrent neural network, and a plurality of segmentation decoders.

14. The non-transitory computer-readable medium of claim 13, further comprising generating one or more feature maps for the plurality of overlapping strips utilizing the encoder and the recurrent neural network.

15. The non-transitory computer-readable medium of claim 14, wherein generating, utilizing the predictive neural network, the electronic version of the document comprises generating the electronic version of the document from the one or more feature maps utilizing the reconstruction decoder.

16. The non-transitory computer-readable medium of claim 14, wherein generating, from the plurality of strip masks, the plurality of combined masks that each indicate elements of a given element type present in the document comprises utilizing each segmentation decoder of the plurality of segmentation decoders to generate a combined mask for a respective element type.

17. A system comprising:

a computer memory device comprising an document image of a document and a predictive neural network; and at least one processor configured to cause the system to:

segment the document image into a plurality of overlapping strips;

generate, utilizing the predictive neural network, a first plurality of strip masks indicating elements of a first element type in the plurality of overlapping strips;

generate, from the first plurality of strip masks, a first combined mask indicating elements of the first element type present in the document;

generate, utilizing the predictive neural network, a second plurality of strip masks indicating elements of a second element type in the plurality of overlapping strips;

generate, from the second plurality of strip masks, a second combined mask indicating elements of the first element type present in the document;

generate, utilizing the predictive neural network, an electronic version of the document; and create, from the first and second combined masks and the electronic version of the document, a segmented electronic version of the document that identifies the elements of the first and second element type in the electronic version of the document.

18. The system of claim 17, wherein the at least one processor is configured to cause the system to generate the first and second plurality of strip masks by applying the predictive neural network to: a given strip of the plurality of overlapping strips, and a portion of a previously-generated mask of an adjacent strip of the plurality of overlapping strips, the portion of the previously-generated mask of the adjacent strip corresponding to a portion of the adjacent strip that overlaps with the given strip.

19. The system of claim 17, wherein:

the predictive neural network comprises an encoder, a reconstruction decoder, a recurrent neural network, and a plurality of segmentation decoders;

the at least one processor is configured to cause the system to:

generate one or more feature maps for the plurality of overlapping strips utilizing the encoder and the recurrent neural network; and generate, utilizing the predictive neural network, the electronic version of the document by processing the one or more feature maps utilizing the reconstruction decoder.

20. The system of claim 19, wherein the at least one processor is configured to cause the system to generate, from the first plurality of strip masks, the first combined mask by utilizing a first segmentation decoder of the plurality of segmentation decoders to generate the first combined mask from the one or more feature maps.

* * * * *